United States Patent
Wingrove et al.

(10) Patent No.: US 10,439,936 B2
(45) Date of Patent: *Oct. 8, 2019

(54) PACKET DATA ROUTING

(71) Applicant: Metaswitch Networks Ltd, Enfield (GB)

(72) Inventors: Simon Wingrove, San Francisco, CA (US); Michael Curtis, San Francisco, CA (US); Shaun Crampton, San Francisco, CA (US); Alex Pollitt, San Francisco, CA (US)

(73) Assignee: Metaswitch Networks Ltd, Enfield (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/969,326

(22) Filed: May 2, 2018

(65) Prior Publication Data

US 2018/0359182 A1 Dec. 13, 2018

Related U.S. Application Data

(63) Continuation of application No. 14/527,575, filed on Oct. 29, 2014, now Pat. No. 9,985,882.

(51) Int. Cl.
*H04L 12/741* (2013.01)
*H04L 12/715* (2013.01)

(52) U.S. Cl.
CPC ............. *H04L 45/74* (2013.01); *H04L 45/64* (2013.01)

(58) Field of Classification Search
CPC ................................ H04L 45/74; H04L 45/64
See application file for complete search history.

(56) References Cited

U.S. PATENT DOCUMENTS

| | | |
|---|---|---|
| 2003/0039260 A1 | 2/2003 | Fujisawa |
| 2004/0190477 A1 | 9/2004 | Olson et al. |
| 2009/0019536 A1 | 1/2009 | Green et al. |
| 2012/0191875 A1 | 7/2012 | Kano |
| 2012/0195317 A1 | 8/2012 | Parker et al. |
| 2012/0314608 A1 | 12/2012 | Okuno et al. |
| 2013/0125230 A1 | 5/2013 | Koponen et al. |
| 2015/0139238 A1 | 5/2015 | Pourdanzi et al. |
| 2016/0112307 A1 | 4/2016 | Shen |

*Primary Examiner* — Yemane Mesfin
*Assistant Examiner* — Henry Baron
(74) *Attorney, Agent, or Firm* — EIP US LLP

(57) ABSTRACT

Measures, including methods, systems, non-transitory computer-readable storage mediums and computer programs for use in routing packet data. At a network switching device, a data packet is received from a device located upstream of the network switching device. The received data packet comprises routing data associated with a routing decision which has been taken for the data packet upstream of the network switching device. The routing data comprises an abstract media access control (MAC) address corresponding to a next hop destination for the data packet located downstream of the network switching device. At the network switching device, the abstract MAC address in the data packet is replaced with a real MAC address of the next hop downstream destination. At the network switching device, the data packet is forwarded towards the next hop downstream destination.

17 Claims, 3 Drawing Sheets

PACKET DATA ROUTING

CROSS-REFERENCE TO RELATED APPLICATIONS

This application is a continuation under 35 U.S.C. § 120 of U.S. application Ser. No. 14/527,575, filed Oct. 29, 2014. The referenced patent application is incorporated by reference in its entirety.

BACKGROUND OF THE INVENTION

Field of the Invention

The present disclosure relates to routing. In particular, but not exclusively, the present disclosure relates to routing packet data.

Description of the Related Technology

Known networks comprise a customer having an internet protocol (IP) network with multiple high-scaled data hosts, such as a content distribution network (CDN). The hosts send large amounts of data toward the Internet, and so the customer requires a router device to route packets between the hosts and various access connections to consumers over the internet. There may also be a relatively small amount of traffic flowing to/from a data center, which is located behind a further router device.

The router device in such a network has high scale requirements. It needs to handle a large IP routing table (for example of the order of 500,000 routes, the size of the Internet's default free zone), and also handle the large amount of bandwidth required. Routers with both of these characteristics are expensive.

Cheaper alternatives tend to handle one of the above scale requirements but not both. OpenFlow-controlled devices with dedicated routing hardware can handle the bandwidth but are not usually capable of handling as many as 500,000 routes in the data plane. Linux-based "virtual" routers with software data planes running on x86 hardware can handle 500,000 routes but cannot handle the large bandwidth required.

Another approach to scaling the system is to divide the responsibility. A commercial off-the-shelf (COTS) Linux virtual router handles the routing decision. The bandwidth is kept low by running many such systems, so each one only handles a small subset of the data. One easy way of doing this is to use the hosts themselves as routing engines. A cheaper OpenFlow device with dedicated hardware handles the packet forwarding. The routing decision has already been made by the COTS Linux systems, so this work is removed from the OpenFlow device. A method of tagging the routing decision on a packet-by-packet basis is required.

There are multiple ways of tagging each packet with the result of the routing decision. The OpenFlow enabled forwarding device needs to be able to match tag, and remove it before forwarding on to the selected next hop. Two known ways of tagging are multiprotocol label switching (MPLS) labels and 802.11Q virtual local area network (VLAN) tags. Linux does not support MPLS-labeled packets, which is a drawback to the approach of using MPLS. Linux does support VLAN tagged interfaces, but there is no standards-based method to signal the mapping between the routes and VLAN identifiers.

SUMMARY

According to first embodiments of the present disclosure, there is a method of routing packet data, the method comprising: at a network switching device, receiving a data packet from a device located upstream of the network switching device, wherein the received data packet comprises routing data associated with a routing decision which has been taken for the data packet upstream of the network switching device, wherein the routing data comprises an abstract media access control (MAC) address corresponding to a next hop destination for the data packet located downstream of the network switching device; at the network switching device, replacing the abstract MAC address in the data packet with a real MAC address of the next hop downstream destination; and at the network switching device, forwarding the data packet towards the next hop downstream destination.

According to second embodiments of the present disclosure, there is a system (or 'apparatus') for use in routing packet data, the system comprising: at least one memory including computer program code; and at least one processor in data communication with the memory, wherein the at least one processor is configured to: at a network switching device, receiving a data packet from a device located upstream of the network switching device, wherein the received data packet comprises routing data associated with a routing decision which has been taken for the data packet upstream of the network switching device, wherein the routing data comprises an abstract media access control (MAC) address corresponding to a next hop destination for the data packet located downstream of the network switching device; at the network switching device, replacing the abstract MAC address in the data packet with a real MAC address of the next hop downstream destination; and at the network switching device, forwarding the data packet towards the next hop downstream destination According to third embodiments of the present disclosure, there is a non-transitory computer-readable storage medium comprising computer-executable instructions, which, when executed by a processor, cause a computing device to perform a method of routing packet data, the method comprising: at a network switching device, receiving a data packet from a device located upstream of the network switching device, wherein the received data packet comprises routing data associated with a routing decision which has been taken for the data packet upstream of the network switching device, wherein the routing data comprises an abstract media access control (MAC) address corresponding to a next hop destination for the data packet located downstream of the network switching device; at the network switching device, replacing the abstract MAC address in the data packet with a real MAC address of the next hop downstream destination; and at the network switching device, forwarding the data packet towards the next hop downstream destination.

According to fourth embodiments of the present disclosure, there is a system (or 'apparatus') for use in routing packet data, the system comprising: at least a first processor; and at least a first memory including first computer program code, the at least first memory and the first computer program code being configured to, with the at least first processor, cause the system at least to: at an upstream device located upstream of a network switching device, take a routing decision in relation to a data packet which is to be delivered downstream of the upstream device, wherein the routing decision generates routing data comprising an abstract media access control (MAC) address corresponding to a next hop destination for the data packet located downstream of the network switching device; at the upstream device, transmit the data packet to the network switching device, wherein the transmitted data packet comprises the generated routing data, the system comprising at least a second processor; and at least a second memory including second computer program code, the at least second memory and the second computer program code being configured to, with the at least second processor, cause the system at least to: at the network switching device, replace the abstract MAC address in the data packet with a real MAC address of the next hop downstream destination; and at the network switching device, forward the data packet towards the next hop downstream destination.

According to embodiments of the present disclosure, there is a computer program comprising a set of instructions, which, when executed by a computerized device, cause the computerized device to perform a method of routing packet data, the method comprising: at a network switching device, receiving a data packet from a device located upstream of the network switching device, wherein the received data packet comprises routing data associated with a routing decision which has been taken for the data packet upstream of the network switching device, wherein the routing data comprises an abstract media access control (MAC) address corresponding to a next hop destination for the data packet located downstream of the network switching device; at the network switching device, replacing the abstract MAC address in the data packet with a real MAC address of the next hop downstream destination; and at the network switching device, forwarding the data packet towards the next hop downstream destination.

Further features of the present disclosure will become apparent from the following description of embodiments, given by way of example only, which is made with reference to the accompanying drawings.

DETAILED DESCRIPTION OF CERTAIN INVENTIVE EMBODIMENTS

Figure 1:
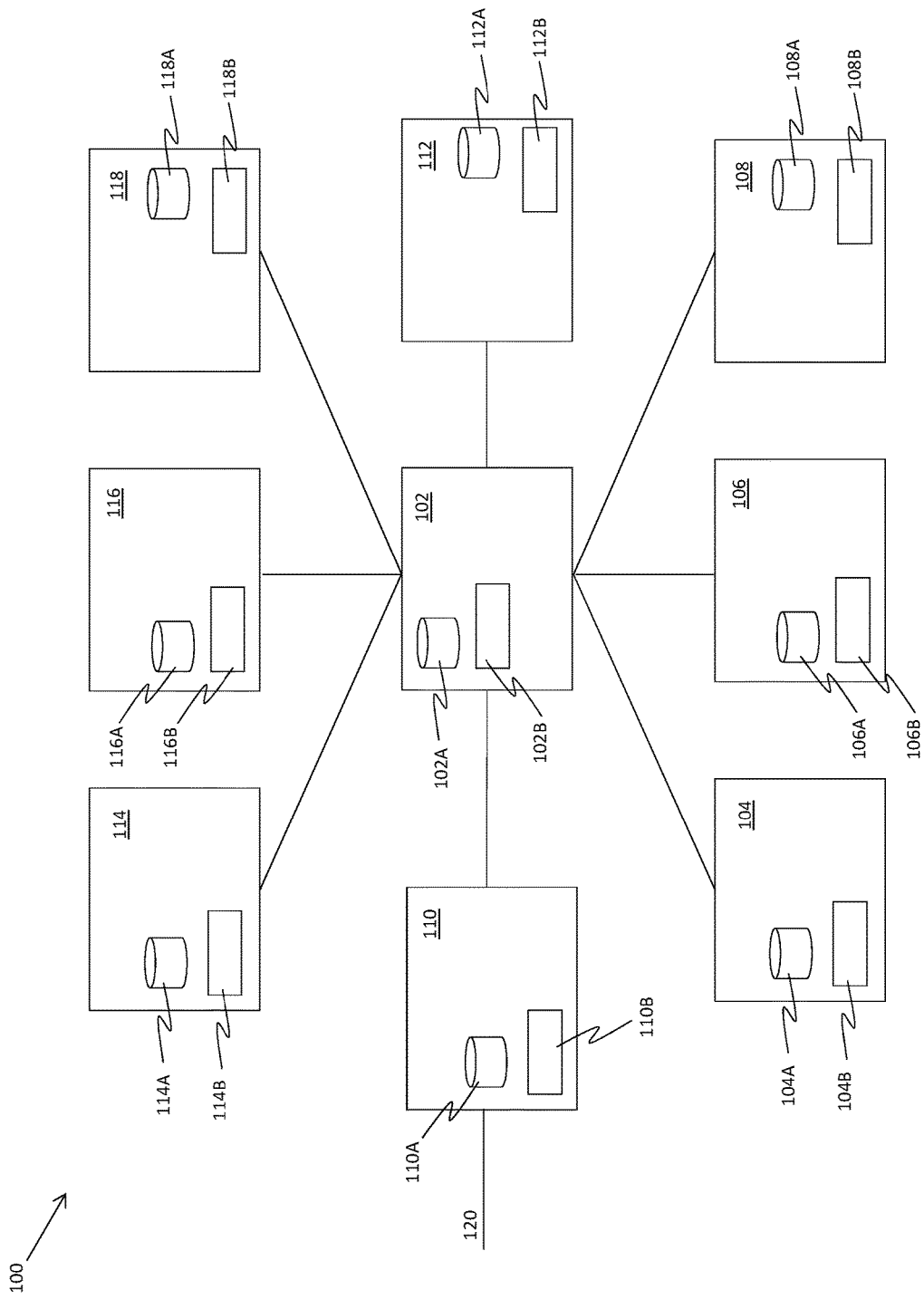
FIG. 1 shows a network according to one or more embodiments of the present invention.

FIG. 1 shows a network 100 according to embodiments. Network 100 is an IP network (or 'packet-switched network') comprising a network switching device (or 'node') 102, one or more data hosts (in this case a plurality of data hosts 104, 106, 108), a data center router 110, a controller device 112, and access connection devices 114, 116, 118.

Network switching device 102 comprises a device configured for forwarding (or 'switching') data (or 'traffic') to/from data hosts 104, 106, 108, data center router 110 and access connection devices 114, 116, 118. In embodiments, there are relatively few routes advertised by data hosts 104, 106, 108, and data center router 110 compared with the number of routes advertised by access connection devices 114, 116, and 118. Network switching device 102 is also connected to controller device 112. Network switching device 102 comprises a database 102A for storing data such as forwarding data and also a processor (or processing system) 102B for performing various data processing tasks according to embodiments. In embodiments, network switching device 102 comprises an OpenFlow controlled device such as an IP switch or IP router device.

Each of data hosts 104, 106, 108 is configured to send relatively large amounts of data toward consumers via the Internet. Data hosts 104, 106, 108 may for example comprise data hosts in a content distribution network comprising a plurality of data hosts. Data hosts 104, 106, 108 comprise respectively a database 104A, 106A, 108A for storing data such as routing data and also a processor (or processing system) 104B, 106B, 108B for performing various data processing tasks according to embodiments. In embodiments, one or more of data hosts 104, 106, 108 comprise content distribution network nodes such as Linux servers.

Data center router 110 is configured to route and/or forward relatively small amounts of data (or 'traffic') to/from a data center (not shown) via connection 120 and network switching device 102. Data center router 110 comprises a database 110A for storing data such as routing data and also a processor (or processing system) 110B for performing various data processing tasks according to embodiments. In embodiments, data center router 110 comprises an external (or 'exterior') border gateway protocol (EBGP) router.

Data passes to/from consumer devices (or 'user equipment', 'user devices', 'customer devices', or 'endpoints'; not shown) over the Internet (not shown) via access connection devices 114, 116, 118. Access connection devices 114, 116, 118 comprise respectively a database 114A, 116A, 118A for storing data such as carrier network data and also a processor (or processing system) 114B, 116B, 118B for performing various data processing tasks according to embodiments. In embodiments, one or more of access connection devices 114, 116, 118 comprise carrier network routers such as EBGP routers.

In the case of data flowing from a host device 104, 106, 108 or data center router 110 via network switching device 102 to an access connection device 114, 116, 118, the host device or data center router is referred to as being located upstream of network switching device 102 and the access connection device is referred to as being located downstream of network switching device 102.

Controller device 112 is configured to control operation and/or configuration of network switching device 102. Controller device 112 comprises a database 112A for storing data such as control or configuration data and also a processor (or processing system) 112B for performing various data processing tasks according to embodiments. In embodiments, controller device 112 comprises an OpenFlow controller device; in some such embodiments, network switching device 102 comprises an OpenFlow controlled device (or 'OpenFlow enabled device') which is controllable by OpenFlow controller device 112.

Embodiments comprise tagging data packets with routing data, for example data relating to a routing decision taken for a given data packet. Embodiments do not require additional data-plane support for MPLS or control plane support for VLANs. Embodiments employ the destination media access control (MAC) address in a way which is transparent to data hosts 104, 106, 108 (such as Linux COTS systems) and/or data center router 110 and/or access connection devices 114, 116, 118 (such as off-the-shelf BGP routing devices).

Embodiments comprise measures, including methods, apparatus, computer programs and computer-readable storage mediums, for use in routing packet data. At network switching device 102, a data packet is received from a device (104, 106, 108 or 110) located upstream of network switching device 102. In some embodiments, the upstream device comprises a data center router, whereas in other embodiments, the upstream device comprises a data host in a content distribution network comprising a plurality of data hosts. In the example embodiments depicted in FIG. 1, the upstream device could be any of devices 104, 106, 108 or 110, but for the sake of this example, is chosen to be device 104.

The received data packet comprises routing data associated with a routing decision which has been taken for the data packet upstream of network switching device 102. The routing data comprises an abstract MAC address corresponding to a next hop destination (114, 116 or 118) for the data packet located downstream of network switching device 102. Network switching device 102 replaces the abstract MAC address in the data packet with a real MAC address of the next hop downstream destination and forwards the data packet towards the next hop downstream destination. In embodiments, the next hop downstream destination comprises a carrier network router.

In embodiments, the data packet is forwarded on the basis of the abstract MAC address.

In embodiments, the data packet is forwarded on the basis of the real MAC address. In some such embodiments, a lookup is performed on the real MAC address to obtain the appropriate interface for forwarding the data packet onto.

Embodiments comprise, at network switching device 102, storing a mapping between the abstract MAC address corresponding to the next hop downstream destination and the real MAC address of the next hop downstream destination; in such embodiments, the replacing is carried out at least on the basis of the stored mapping.

In embodiments, the routing data was generated by upstream device 104 in relation to a routing decision taken by upstream device 104. In embodiments, the routing decision was taken by a virtual router running (or 'instantiated') on upstream device 104.

In embodiments, the abstract MAC address is comprised in a dedicated range of abstract MAC addresses which are different from the real MAC addresses of one or more respective downstream destinations. In embodiments, the abstract MAC address is not contactable; in other words, the abstract MAC address is not a MAC address which corresponds to a real physical address, but instead acts as an indirect reference address for enabling data packet tagging according to embodiments.

Embodiments comprise network switching device 102, prior to receiving the data packet, receiving from upstream device 104, an address resolution protocol (ARP) or IPv6 Neighbor Discovery (ND) request comprising an abstract internet protocol (IP) address corresponding to a destination for the data packet. Network switching device 102 responds to the received ARP or ND request with an ARP or ND response comprising the abstract MAC address corresponding to the next hop downstream destination for the data packet. In embodiments, the abstract IP address is not contactable; in other words, the abstract MAC address is not an IP address which corresponds to a configured logical address, but instead acts as an indirect reference address for enabling data packet tagging according to embodiments. In embodiments, the destination for the data packet may for example correspond to a desired final destination for the data packet such as an IP address of an endpoint device (not shown) or suchlike in a carrier network.

In embodiments, the abstract IP address is comprised in a dedicated range of private IP addresses which are private to one or more local network devices, for example private to some or all of the devices depicted in FIG. 1.

In embodiments, upstream device 104 is configured to treat the destination corresponding to the abstract IP address as directly connected to it over an interface towards network switching device 102. In some such embodiments, the destination corresponding to the abstract IP address is not directly connected to upstream device 104.

Embodiments comprise configuring network switching device 102 to send received ARP requests to a controller device 112, and in response to the configuration, obtaining, at network switching device 102, the abstract MAC address via a lookup at controller device 112 on the basis of the abstract IP address in the received ARP request. In embodiments, an ARP request associated with the received data packet originates at upstream device 104 and passes via network switching device 102 and on to controller 112, with a corresponding response passing back to upstream device 104 via network switching device 102.

In the following embodiments, the routing protocol in use in network 100 is assumed to be BGP, it is assumed that network switching device 102 comprises customized forwarding hardware in the form of a switch. It is also assumed that the switch is OpenFlow controlled by an OpenFlow controller device 112, and that the data hosts are CDN servers. However, none of these assumptions are requirements and embodiments can equally be applied when none or only some of these assumptions are made.

In embodiments, OpenFlow controller 112 runs a standard BGP control plane, and calculates the normal forwarding information base (FIB) with approximately 500,000 routes. However, this is not programmed down to the OpenFlow forwarding hardware comprised by network switching device 102.

In embodiments, OpenFlow controller 112 sets aside a dedicated (or 'special') IP address range for this function. In embodiments, the IP addresses in the dedicated range are not advertised outside of the locally-controlled devices. In embodiments, a range within private IP addresses is recommended. IP addresses in the dedicated range are referred to as "abstract IP addresses".

OpenFlow controller 112 sets aside the same number of special MAC addresses, and implements an algorithmic (for example deterministic) mapping from abstract IP address to abstract MAC address. MAC addresses in the dedicated range are referred to as "abstract MAC addresses".

In embodiments, the BGP stack running on OpenFlow controller 112 is altered so that when a route is advertised to the data hosts, the next-hop is not set to be the OpenFlow forwarding hardware of network switching device 102, but instead an abstract IP address corresponding to the correct carrier destination for the packet.

In embodiments, OpenFlow controller 112 and switch 102 are set up to respond to ARP or ND requests for an abstract IP address with the corresponding abstract MAC address.

In embodiments OpenFlow controller 112 programs (or 'configures') switch 102 to match the destination MAC address, and forward the data packet towards the appropriate access connection device 114, 116, 118 (for example a carrier network router).

In embodiments, the data hosts are configured to treat the entire abstract IP address range as directly connected to them over the interface towards the OpenFlow switch 102.

Note that data packets flowing in the upstream direction from access connection devices 114, 116, 118 towards network switching device 102 (as opposed to flowing in the opposite, downstream direction towards the access connection devices from network switching device 102) are routed normally to the CDNs and data center. This requires a relatively small longest prefix match table in the network switching device (router) 102 because there are relatively few routes exported by the CDNs and data center.

Therefore, in embodiments, the data hosts make a routing decision, will find an abstract IP address as the next hop, will determine that they are directly connected, will ARP or perform neighbor discovery, and will use the abstract MAC address on the packet to direct the data packet(s) to the OpenFlow hardware of network switching device 102. The OpenFlow hardware of network switching device 102 matches on this abstract MAC address, and switches (forwards) the data packet towards the appropriate carrier destination 114, 116, 118.

The action of embodiments is to push the routing decision of which access connection device should be the next hop for data packets passing in the downstream direction (e.g. out to the Internet) to the data center router or data host devices. Their routing tables associate each route with an "abstract" next hop IP address to which they are configured to act as if they are directly connected to at Layer 2. This causes these devices to ARP or perform neighbor discovery on the abstract IP address, which the network switching device proxies and returns an abstract MAC address that uniquely corresponds to a single access connection device. Data packets from either the data center or data host devices, sent to destinations in a given access connection device's reachable network are sent with the abstract MAC address associated with the given access connection device as their destination MAC address. The network switching device has one or more configured rules which match the abstract MAC addresses and the network switching device replaces each abstract MAC address with the corresponding real MAC address for the appropriate access connection device and forwards the data packet out of the corresponding port.

Embodiments comprise allocating abstract IP addresses. In embodiments, an abstract IP address is employed for each "real" next hop; typically, this means one abstract IP address per carrier router. In embodiments, the "real" next hop is not used verbatim (for example by enabling third-party next hop) because the next hop IP addresses of different carriers will not usually be limited to a single IP prefix, requiring per-carrier configuration on the CDN servers to force the CDN to believe that the carrier next hop is directly connected. Using a dedicated IP range for the abstract IP addresses requires only a single piece of configuration on the CDNs.

Embodiments comprise mapping abstract IP addresses to abstract MAC addresses. In embodiments, network switching device 102 is configured to send ARP or neighbor discovery requests from data hosts 104, 106, 108 to controller 112. In embodiments, controller 112 inspects the incoming requests. If the target IP address of the request is in the abstract IP address range, then controller 112 generates a response, for example according to a deterministic algorithm. In embodiments, the abstract IP address range is a subnet which has 2 bytes for a carrier identifier (e.g. a/16 subnet for IPv4). In embodiments, controller 112 prefixes those two bytes with a fixed 32-bit prefix to generate the 48-bit abstract MAC address. In embodiments, the two bytes are structured so that the first byte identifies the appropriate network switching device 102 and the second byte identifies the appropriate access connection device 114, 116, 118.

Figure 2:
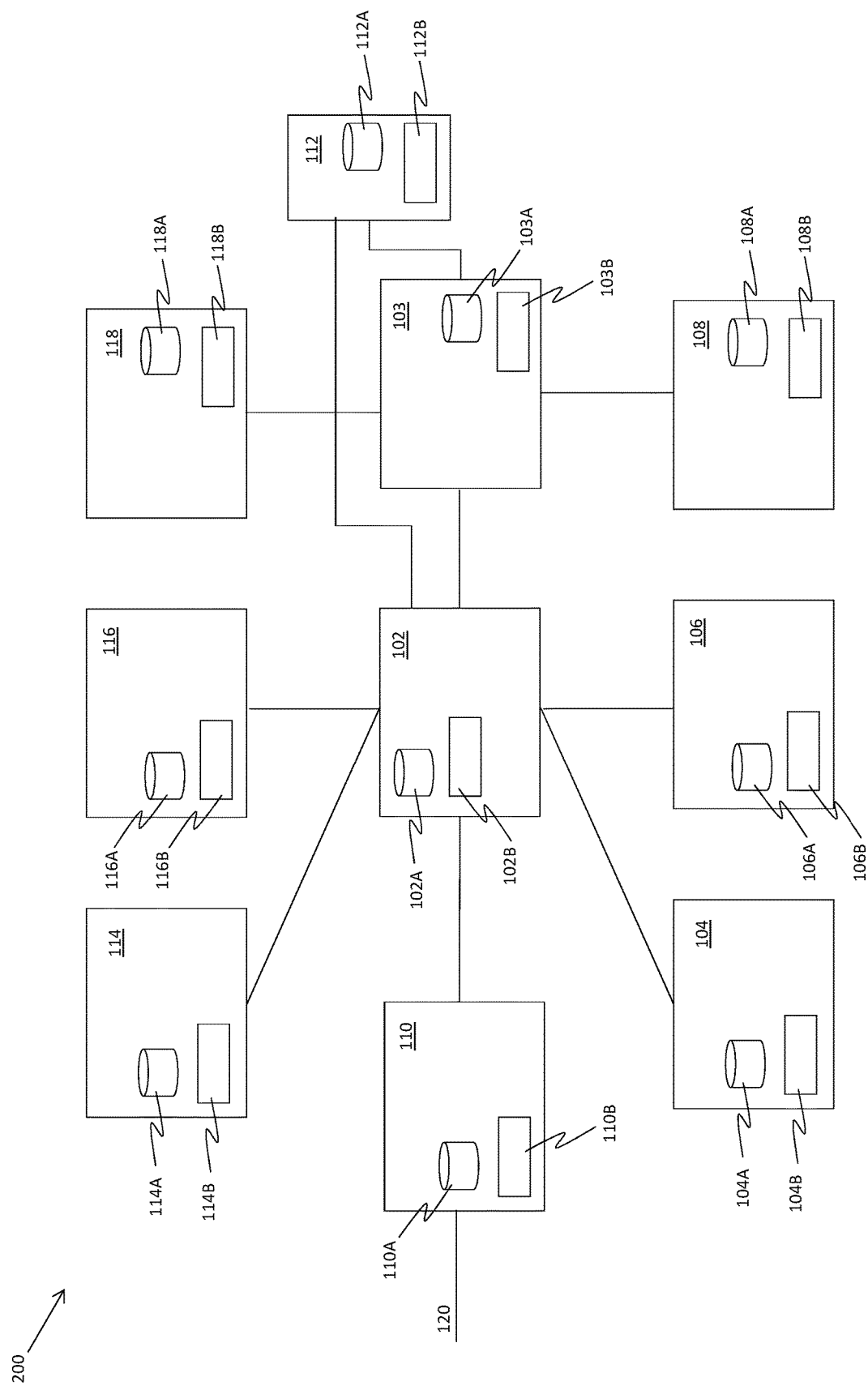
FIG. 2 shows a network according to one or more embodiments of the present invention.

FIG. 2 shows a network 200 according to embodiments. Network 200 comprises some similar entities to network 100 depicted in FIG. 1. In the embodiments of FIG. 2 however, two network switching devices in the form of network switching device 102 and network switching device 103 are connected between the data hosts 104, 106 and 108 and the access connection devices 114, 116, 118. Network switching device 103 comprises a database 103A for storing data such as forwarding data and also a processor (or processing system) 103B for performing various data processing tasks according to embodiments. In the embodiments of FIG. 2, controller device 112 is depicted as having control connections to both network switching device 102 and network switching device 103. In the embodiments of FIG. 2, instead of data host 108 being connected to network switching device 102, data host 108 is connected to network switching device 103. In the embodiments of FIG. 2, instead of access connection device 118 being connected to network switching device 102, access connection device 118 is connected to network switching device 103.

To support multiple OpenFlow controlled network switching device embodiments, for example as depicted in FIG. 2, network switching device 102 and network switching device 103 each run their own BGP stack (at the controller). In embodiments, network switching devices 102 and 103 establish a BGP connection to each other and distribute the abstract IP addresses as they would to a data host such as a CDN. In embodiments, BGP does a normal routing calculation to determine what to export to the data hosts/data center/access connection devices. In embodiments, when one of network switching device 102 and 103 is exporting a route that has an abstract next hop learned from the other of network switching device 102 and 103, it preserves the next hop verbatim. In embodiments, controller 112 configures a switching rule for each abstract next hop on one of network switching device 102 and 103 (or a wildcarded rule if supported) that switches packets unaltered to the other of network switching device 102 and 103. In embodiments, the relatively few routes to the data center and data hosts are handled normally (i.e. without abstract MAC addresses).

In further embodiments, controller 112 passes the relevant routing information between the two network switching devices 102 and 103, without the BGP connection. Such embodiments have improved convergence time and lower overhead on the OpenFlow network switching devices 102 and 103 from passing control traffic.

Figure 3:
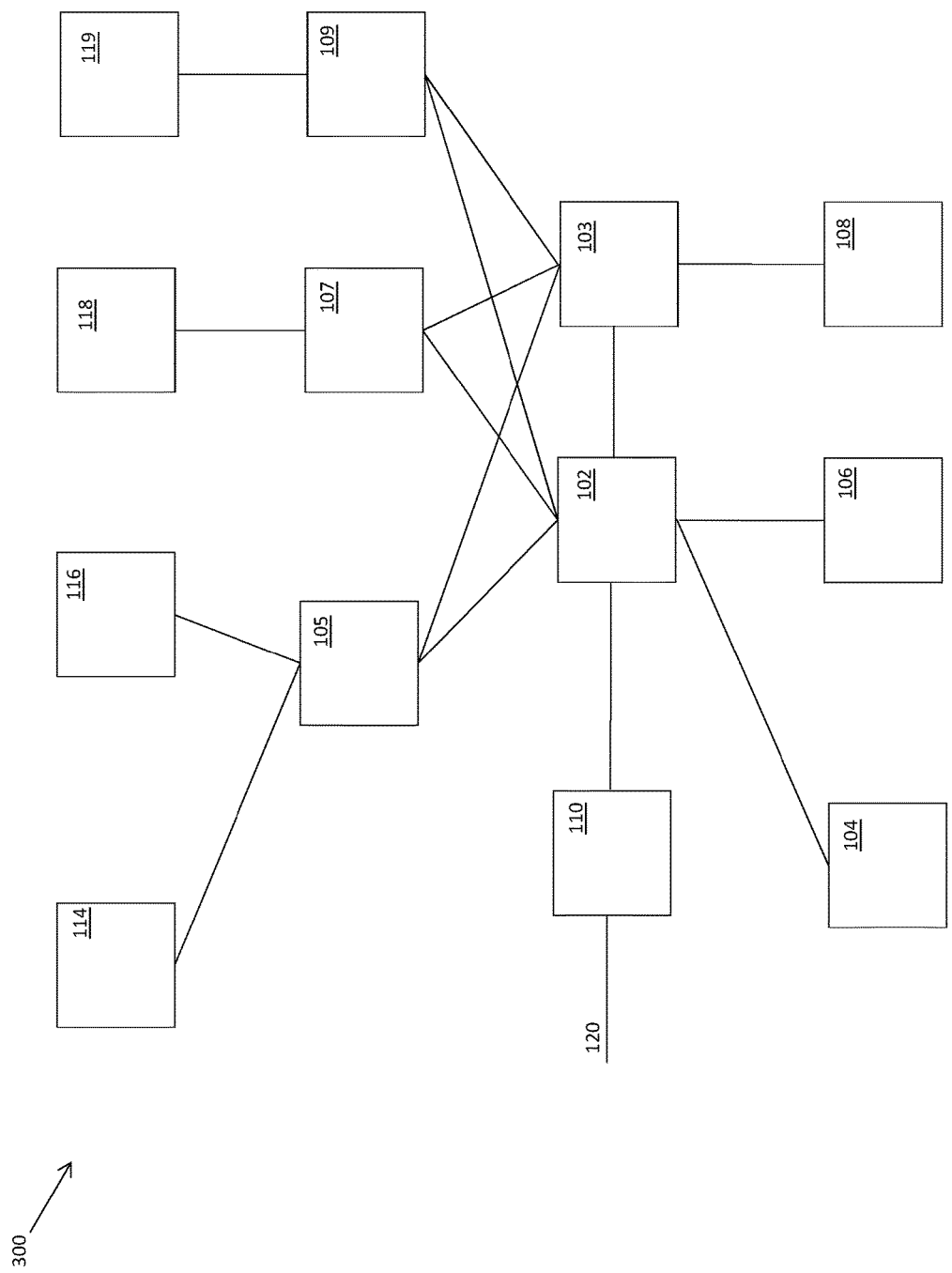
FIG. 3 shows a network according to one or more embodiments of the present invention.

FIG. 3 shows a network 300 according to embodiments. Network 300 comprises some similar entities to network 200 depicted in FIG. 2. In the embodiments of FIG. 3 however, network 300 comprises three further network switching devices 105, 107, 109 in addition to network switching devices 102 and 103. Network switching devices 102 and 103 can be seen to form a lower tier of a mesh arrangement and network switching devices 105, 107 and 109 can be seen to form an upper tier of the mesh arrangement. Network switching device 105 connects to access connection devices 114 and 116, network switching device 107 connects to access connection device 118, and network switching device 109 connects to access connection device 119. In the embodiments of FIG. 3, databases and processors have been omitted for the sake of readability, although in practice these would be present in each entity. In the embodiments of FIG. 3, controller 112 has been omitted for the sake of readability, although in practice this would be present and connected to one or more of network switching devices 102, 103, 105, 107, and 109. The embodiments of FIG. 3 depict example embodiments where a dual-tier approach is employed to support more than two network switching devices (or 'switches'). Network switching devices in the upper tier only connect to access connection devices. Network switching devices in the lower tier only connect to data hosts 104,

106, 108 and there is a full mesh between the two tiers. In embodiments, there are no interconnects between switches in the same tier.

With the arrangement employed in FIG. 3, from each access connection device and data host pair's point of view, there are two (e.g. OpenFlow controlled) switches in the path in a similar way to the dual switch case described in relation to FIG. 2 above. In embodiments, internal (or 'interior') BGP is used between the switching nodes in the cluster to prevent routing loops (by default, iBGP does not re-export the internal links).

In embodiments, the lower tier network switching devices ascertain where to direct abstract IP/MAC addresses by splitting up the space (for example by using one byte to indicate which switch and one byte to indicate which access connection device on that switch) or by using an allocation process in the controller.

In embodiments, various entities (for example devices or other apparatus) are described as comprising a processor or processing system, for example as depicted by processors 102B, 104B, 110B or 114B in FIG. 1. In embodiments, the processing system comprises one or more processors and/or memory. Each device as described in relation to any of the embodiments described above may similarly comprise a processor and/or processing system. One or more of the aspects of the embodiments described herein with reference to the drawings comprise processes performed by devices. In embodiments, a device comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

The above embodiments are to be understood as illustrative examples of the present disclosure. Further embodiments are envisaged. Some example further embodiments are laid out below.

Some embodiments described above concern mapping abstract IP addresses to abstract MAC addresses. Such embodiments work well because they are algorithmic and/or stateless. However, some models of switch have constrained OpenFlow pipelines that do not support rewriting the destination MAC address concurrently with Access Control List (ACL) rules. To support such switches, alternative embodiments comprise responding to an ARP request with the real MAC address for the carrier next hop rather than an abstract MAC address. This means that the OpenFlow switch is not required to switch MAC addresses (and hence use can be made of the constrained layer 2 (L2) forwarding tables). In embodiments, this is carried out by, upon receiving an ARP request at the controller, mapping the abstract IP to real carrier next hop, queuing the request, issuing an ARP to the real next hop (unless this has already been cached) and when receiving an ARP response from the carrier looking for queued requests from data host servers and generating an ARP response with the carrier MAC address.

Embodiments described herein involve the upstream devices (for example data hosts or data center routers) transmitting ARP requests in relation to abstract IP addresses. In some embodiments, in order for an upstream device to ARP for an abstract IP address, it must believe that the abstract IP address is part of the broadcast domain on that interface. In embodiments, if the upstream device does not believe that it is connected to the same broadcast domain, then it may ARP for its default gateway instead and that ARP may not carry sufficient information for the controller to respond with the correct MAC address. Therefore, in some embodiments, the interface is configured with multiple connected subnets and in other embodiments the abstract IP address range shares a subnet with the other addresses on the link.

In embodiments, a distinct abstract IP address range is employed. Some devices require that a device has an IP address of its own in the subnet added to the link; in such scenarios, the necessary IP address is in the abstract range and requires special handling if the device originates traffic from that address (for example, if the user initiates a ping to an IP address in that subnet). In some embodiments, all the IP addresses for the data center router, network switching routers, data hosts and abstract IP addresses are chosen from the same subnet so that only a single (consistent) IP address is employed per interface.

Embodiments described herein involve three access connection devices 114, 116, 118; in practice, there may be a different number of access connection devices. Embodiments described herein involve three data hosts 104, 106, 108; in practice, there may be a different number of data host devices.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure, which is defined in the accompanying claims.

What is claimed is:

1. A non-transitory computer-readable storage medium comprising computer-executable instructions, which, when executed by a processor, cause a computing device to perform a method of routing packet data, the method comprising:
   at a network switching device, prior to receiving a data packet, receiving from a device located upstream of the network switching device, an address resolution protocol (ARP) or neighbor discovery (ND) request comprising an abstract internet protocol (IP) address corresponding to a destination for the data packet;
   at the network switching device, responding to the received request with a response comprising an abstract media access control (MAC) address corresponding to a next hop downstream destination for the data packet;
   at the network switching device, receiving the data packet from the upstream device,
   wherein, prior to being received by the network switching device, the received data packet has been tagged by the upstream device such that the received data packet comprises routing data associated with a routing decision which has been taken for the data packet upstream of the network switching device by the upstream device, wherein the routing data comprises the abstract MAC address corresponding to the next hop destination for the data packet located downstream of the network switching device; and wherein the abstract MAC address acts as an indirect reference address to enable data packet tagging;

at the network switching device, matching the abstract MAC address with a real MAC address of the next hop downstream destination, wherein the network switching device stores a mapping between the abstract MAC address and the real MAC address of the next hop downstream destination, and wherein the real MAC address corresponds to a physical address of the next hop downstream destination; and at the network switching device, replacing the abstract MAC address in the data packet with the real MAC address of the next hop downstream destination; and at the network switching device, forwarding the data packet towards the next hop downstream destination.

2. The non-transitory computer-readable storage medium according to claim 1, wherein the data packet is forwarded on the basis of the abstract MAC address.

3. The non-transitory computer-readable storage medium according to claim 1, wherein the data packet is forwarded on the basis of the real MAC address.

4. The non-transitory computer-readable storage medium of claim 1,
wherein the replacing is carried out at least on the basis of the stored mapping.

5. The non-transitory computer-readable storage medium of claim 1, wherein the routing data was generated by the upstream device in relation to a routing decision taken by the upstream device.

6. The non-transitory computer-readable storage medium of claim 1, wherein the abstract MAC address is comprised in a dedicated range of abstract MAC addresses which are different from the real MAC addresses of one or more respective downstream destinations.

7. The non-transitory computer-readable storage medium of claim 1, wherein the abstract MAC address is not contactable.

8. The non-transitory computer-readable storage medium of claim 1, wherein the abstract IP address is not contactable.

9. The non-transitory computer-readable storage medium of claim 1, wherein the abstract IP address is comprised in a dedicated range of private IP addresses which are private to one or more local network devices.

10. The non-transitory computer-readable storage medium of claim 1, wherein the upstream device is configured to treat the destination corresponding to the abstract IP address as directly connected to the upstream device over an interface towards the network switching device.

11. The non-transitory computer-readable storage medium of claim 10, wherein the destination corresponding to the abstract IP address is not directly connected to the upstream device.

12. The non-transitory computer-readable storage medium of claim 1, comprising:
configuring the network switching device to send received ARP or ND requests to a controller device; and
in response to the configuration, obtaining, at the network switching device, the abstract MAC address via a lookup at the controller device on the basis of the abstract IP address in the received request.

13. The non-transitory computer-readable storage medium of claim 12, wherein the controller device comprises an OpenFlow controller device and the network switching device comprises an OpenFlow controlled device.

14. A non-transitory computer-readable storage medium comprising computer-executable instructions, which, when executed by a processor, cause a computing device to perform a method of routing packet data, the method comprising:
at a network switching device, receiving a data packet from a device located upstream of the network switching device,
wherein the upstream device comprises: a data center router, or a data host in a content distribution network comprising a plurality of data hosts,
wherein, prior to being received by the network switching device, the received data packet has been tagged by the upstream device such that it comprises routing data associated with a routing decision which has been taken for the data packet upstream of the network switching device by the upstream device,
wherein the routing data comprises an abstract media access control (MAC) address corresponding to a next hop destination for the data packet located downstream of the network switching device; and
wherein the abstract MAC address acts as an indirect reference address to enable data packet tagging;
at the network switching device, matching the abstract MAC address with a real MAC address of the next hop downstream destination,
wherein the network switching device stores a mapping between the abstract MAC address and the real MAC address of the next hop downstream destination,
and wherein the real MAC address corresponds to a physical address of the next hop downstream destination; and
at the network switching device, replacing the abstract MAC address in the data packet with the real MAC address of the next hop downstream destination; and
at the network switching device, forwarding the data packet towards the next hop downstream destination.

15. An apparatus for use in routing packet data, the apparatus comprising: at least one memory including computer program code; and at least one processor in data communication with the memory, wherein the at least one processor is configured to:
at a network switching device, receive a data packet from a device located upstream of the network switching device,
wherein the upstream device comprises: a data center router, or a data host in a content distribution network comprising a plurality of data hosts,
wherein, prior to being received by the network switching device, the received data packet has been tagged by the upstream device such that it comprises routing data associated with a routing decision which has been taken for the data packet upstream of the network switching device by the upstream device,
wherein the routing data comprises an abstract media access control (MAC) address corresponding to a next hop destination for the data packet located downstream of the network switching device; and
wherein the abstract MAC address acts as an indirect reference address to enable data packet tagging;
at the network switching device, match the abstract MAC address with a real MAC address of the next hop downstream destination, wherein the network switching device stores a mapping between the abstract MAC address and the real MAC address of the next hop downstream destination, and wherein the real MAC address corresponds to a physical address of the next hop downstream destination; and at the network switching device, replace the abstract MAC address in the data packet with the real MAC address of the next hop downstream destination; and at the network switching device, forward the data packet towards the next hop downstream destination.

16. A non-transitory computer-readable storage medium comprising computer-executable instructions, which, when executed by a processor, cause a computing device to perform a method of routing packet data, the method comprising:

at a network switching device, receiving a data packet from a device located upstream of the network switching device, wherein the upstream device comprises a data host in a content distribution network comprising a plurality of data hosts, wherein, prior to being received by the network switching device, the received data packet has been tagged by the upstream device such that it comprises routing data associated with a routing decision which has been taken for the data packet upstream of the network switching device by the upstream device, wherein the routing decision was taken by a virtual router running on the upstream device, wherein the routing data comprises an abstract media access control (MAC) address corresponding to a next hop destination for the data packet located downstream of the network switching device; and wherein the abstract MAC address acts as an indirect reference address to enable data packet tagging;

at the network switching device, matching the abstract MAC address with a real MAC address of the next hop downstream destination, wherein the network switching device stores a mapping between the abstract MAC address and the real MAC address of the next hop downstream destination, and wherein the real MAC address corresponds to a physical address of the next hop downstream destination; and at the network switching device, replacing the abstract MAC address in the data packet with the real MAC address of the next hop downstream destination; and at the network switching device, forwarding the data packet towards the next hop downstream destination.

17. A non-transitory computer-readable storage medium comprising computer-executable instructions, which, when executed by a processor, cause a computing device to perform a method of routing packet data, the method comprising:

at a network switching device, receiving a data packet from a device located upstream of the network switching device, wherein, prior to being received by the network switching device, the received data packet has been tagged by an upstream device such that it comprises routing data associated with a routing decision which has been taken for the data packet upstream of the network switching device by the upstream device, wherein the routing data comprises an abstract media access control (MAC) address corresponding to a next hop destination for the data packet located downstream of the network switching device, wherein the next hop downstream destination comprises a carrier network router, and wherein the abstract MAC address acts as an indirect reference address to enable data packet tagging;

at the network switching device, matching the abstract MAC address with a real MAC address of the next hop downstream destination, wherein the network switching device stores a mapping between the abstract MAC address and the real MAC address of the next hop downstream destination, and wherein the real MAC address corresponds to a physical address of the next hop downstream destination; and at the network switching device, replacing the abstract MAC address in the data packet with the real MAC address of the next hop downstream destination; and at the network switching device, forwarding the data packet towards the next hop downstream destination.

* * * * *